United States Patent [19]

Haeder

[11] 4,236,047
[45] Nov. 25, 1980

[54] SEALING DEVICE FOR SUPPORTING CABLES IN A CABLE FITTING

[75] Inventor: Wolfgang Haeder, Eichenau, Fed. Rep. of Germany

[73] Assignee: Siemens Aktiengesellschaft, Berlin & Munich, Fed. Rep. of Germany

[21] Appl. No.: 971,701

[22] Filed: Dec. 21, 1978

[30] Foreign Application Priority Data

Dec. 22, 1977 [DE] Fed. Rep. of Germany ... 7739190[U]

[51] Int. Cl.³ .......................................... H02G 15/013
[52] U.S. Cl. .................................... 174/77 R; 174/93
[58] Field of Search .................... 174/77 R, 91, 92, 93

[56] References Cited

U.S. PATENT DOCUMENTS

| 3,545,774 | 12/1970 | Rickley | 277/164 |
|---|---|---|---|
| 4,002,818 | 1/1977 | Kunze et al. | 174/77 R X |
| 4,103,911 | 8/1978 | Giebel et al. | 174/77 R X |

FOREIGN PATENT DOCUMENTS 2427677 7/1974 Fed. Rep. of Germany .

Primary Examiner—Roy N. Envall, Jr.
Attorney, Agent, or Firm—Hill Van Santen, Steadman, Chiara & Simpson

[57] ABSTRACT

A sealing device characterized by two sealing members which are clamped together to support at least one cable within a cable fitting. Each of the sealing member has at least two axially spaced lamella-form sealing elements, which extend inward from a separation plane and have a ring-shape hollow space therebetween. The sealing elements are cut in an appropriate position for receiving the cable adjacent to the separation plane. The improvement includes a disk shape member in the ring-shape space to subdivide each of the spaces and to prevent the flow of a sealing material, which is disposed between the sealing elements and the cable, into the ring-shape spaces.

5 Claims, 3 Drawing Figures

SEALING DEVICE FOR SUPPORTING CABLES IN A CABLE FITTING

BACKGROUND OF THE INVENTION

The present invention is directed to a sealing device which utilizes a pair of sealing members to support at least one cable in a cable fitting. Each member has lamella-form sealing elements which are axially spaced on the member and extend to a separation plane. The cable in held in an opening or aperture that is formed in the sealing elements at the separation plane.

In the cable fitting technology, sealing bodies of thermoplastic material are already known and find application in the introductory area as a sealing closure or gasket between a cable and a cable fitting. Such a sealing device with members containing lamella-form sealing elements is known from German OS No. 24 27 677, which was the basis for U.S. patent application Ser. No. 584,522 which was refiled as a continuation-in-part application Ser. No. 783,752 that issued on Aug. 1, 1978 as U.S. Pat. No. 4,103,911. In this sealing member, the cable introduction opening or aperature is cut out according to need. The separation planes are covered with a plastic sealing compound and after pressing the member together the sealing compound seals all parts in a gas-tight relationship as well as the cable in each of the apertures.

In U.S. Pat. No. 3,545,773, a sealing member is described, which exhibits ring-shaped lamella on the outside. The side facing the cable is designed as a sealing chamber and is filled up with a expandable material. For this, however, a special device is needed. When any mechanical forces are applied on a cable, it becomes possible under certain conditions that the thin-walled lamellae will become deformed because of their elasticity within lateral limitations and, thus, the lamellae more or less displace the plastic sealing compound. In critical cases, this can lead to leakage in the gas-tight seal.

SUMMARY OF THE INVENTION

The present invention is based on a solution for creating sealing members for the introduction areas of cable fittings which members exhibit the advantage of a lamella form structure, but which are particularly suited for use with cables that are subjected to mechanical forces. A further advantage of the present invention is that the mounting of these sealing members can be undertaken with traditional tools.

To accomplish these tasks, the present invention is directed to an improvement in a sealing device comprising at least two sealing members each having at least two axially spaced lamella-form sealing elements extending to a separation plane and having a ring-shape hollow space between adjacent sealing elements, said sealing elements being adapted to be cut to form an aperture for receiving a cable to support a cable in a cable fitting and means for holding the members with the separation planes in engagement with each other and the sealing elements in tight engagement with a plastic material to form a tight seal with a cable. The improvement comprises providing semicircular disks of cuttable material, which are received in each of the ring-shaped hollow spaces between adjacent sealing elements of each member, each of said disks having a thickness less than the axially width of the ring-shaped hollow space. Each of said disks has means disposed on each side for guiding a disk as it is inserted into the space and has transverse ribs extending between said means for guiding. Preferable, the means for guiding comprises means for forming a groove for receiving each of the reinforcing ribs on the sealing elements and each of the means for forming a groove in a pair of ribs which preferably converge toward each other so that the nearest spacing therebetween is adjacent separation plane.

These essence of the invention is to be seen by the fact that the ring-shape hollow spaces of the individual sealing members are filled up with disks which help to stiffen the various lamella-form sealing elements. Since the thickness of the disks is smaller than the axial width of the hollow spaces, the lamella structure is still maintain, and thus, the original hollow spaces are, in certain sense, again subdivided. Because of these inserted disks, the flow of the inserted plastic sealing compound, which is gripped at the openings of the sealing elements when the members are secured on a cable, is opposed by a greater resistance force so that this sealing compound can no longer easily be displaced into the hollow spaces upon the application the mechanical forces to the cable. A further increase of the resistance to flow of the inserted plastic sealing compound is achieved by means of the transverse ribs, which extend between the ribs forming the guide means and these transverse ribs are arranged on both sides of the inserted disks and extend parallel to the separation plane. The presence of these ribs and the insertion of the disks prevents the plastic sealing compound from penetrating into the hollow spaces as deeply as it would if the disks were not present. Since, the lamella-form sealing elements of a sealing member already have stiffening ribs running perpendicularly to the cable direction and extending inward from the separation plane, the insertable disks must exhibit corresponding recesses or guiding means such as guiding grooves which are preferably pair of guiding ribs which receive the stiffening ribs and provide the advantage of a good guidance of the disks as is being inserted into the hollow spaces. A twisting of the disks within the hollow spaces upon cutting of the cable introduction openings or apertures can also be prevented due to the presence of the guiding means. A solution to the problem posed in accordance to the present invention is thus fully realized during the formation of the required cable introduction opening or aperature wich is cut out with the traditional tools. Because of the inserted disks, the good properties of a lamella seal are maintained with consideration of the complicated conditions arising from the mechanically loading of the cables. These structures feature still maintain a good tightness for the sealing device with relatively low closing pressure.

DESCRIPTION OF THE PREFERRED EMBODIMENT

Figure 1:
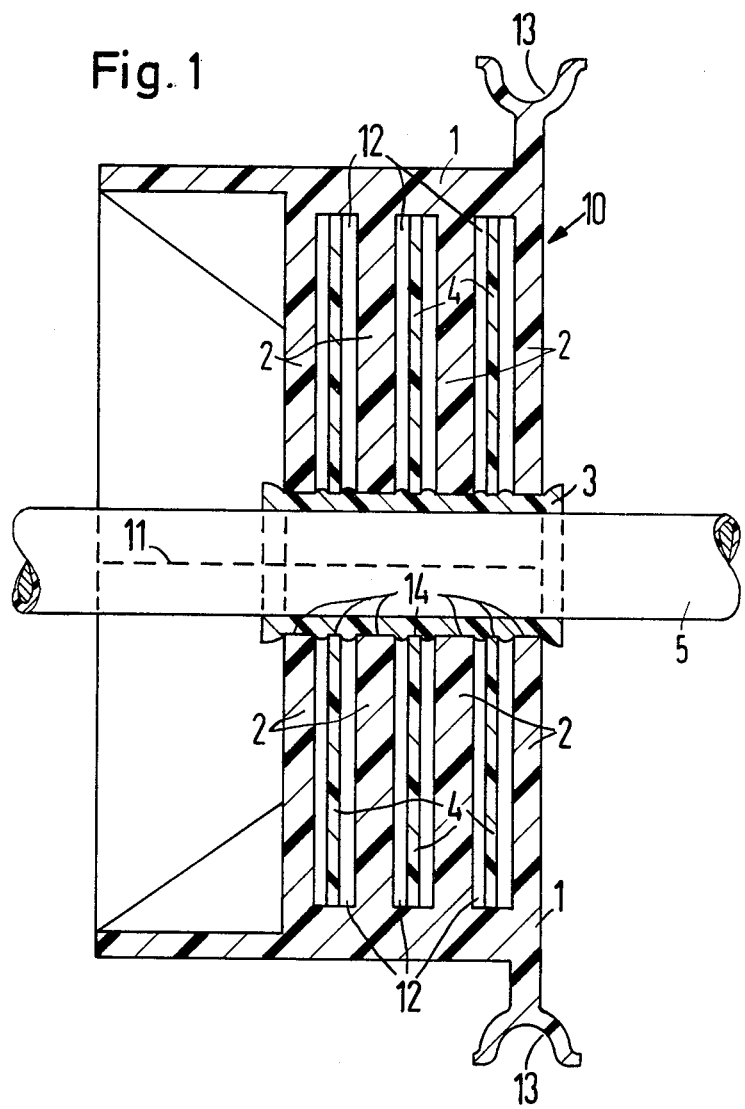
FIG. 1 is a cross sectional view with portions in elevation of the sealing device in accordance with the present invention.

The principles of the present invention are particularly useful in a sealing device generally indicated 10 in FIG. 1. The sealing device 10 includes a pair of sealing members 1, which are clamped together on a long separation plane 11 on a sealing or permanent plastic sealing compound 3 which surrounds a cable 5 which is disposed in an aperture 14 formed for the cable 5 in the pair of members 1.

Each of the sealing members 1 has a plurality of lamella-form sealing elements 2, which are spaced apart in the axial direction to provide ring-shaped semicircular spaces 12. As illustrated, the pair of the members 1 has a circumventional bell shape groove 13 that extend around the outside of device 10 and is adapted to receive a sealing element that will form a seal between the device 10 and a fitting. Each of the sealing elements 2 can have a portion of the aperture 14 cut therein which aperature 14 corresponds to the cable diameter such as the diameter of the cable 5, which cable is covered with the sealing compound 3 in the axial portion which is to be engaged by the elements 2.

In the ring-shape hollow spaces 12, which are formed between each pair of sealing elements 2, a disk 4 is inserted and is provided with a portion of the aperture at the same time as the opening or aperatures for the cable 5 is provided in the element 2. Each of the disks 4 substantially subdivides the space 12 into two hollow spaces and the presence of the disks increases the resistance of flow of the sealing compound 3 into the ring-shape areas 12. Thus, the sealing compound 3 no longer penetrates so deeply into the hollow spaces and the presence of the disks 4 prevents displacement of the sealing elements 2 when the cable 5 and sealing device 10 are subjected to mechanical loading or forces.

Figure 2:
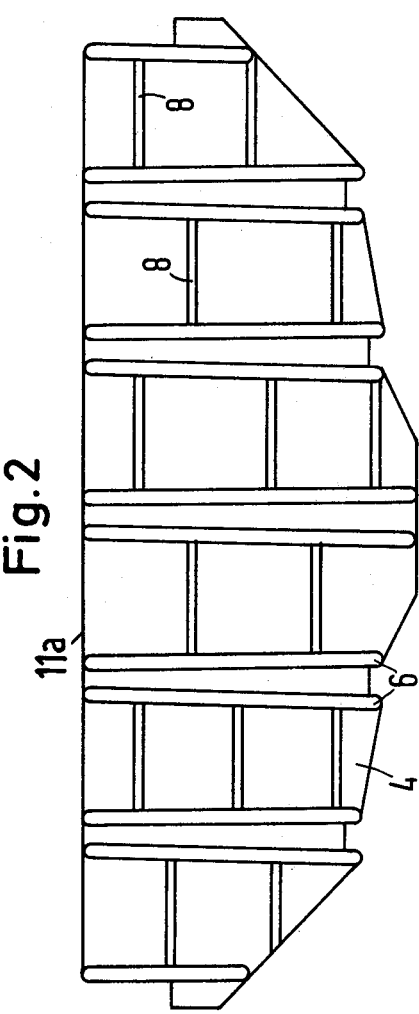
FIG. 2 is a plan view of an insert in accordance with the present invention.

As best illustrated in FIG. 2, each of the disks 4 which is inserted into the hollow spaces are primarily adapted to the shape of the ring-shaped hollow spaces 12. Since the sealing members 1 are semicircular in shape, each of the disks thus exhibit an approximate semicircular shape. The sealing elements 2 of the sealing member 1, however, exhibit perpendicular stiffening ribs 7 for reinforcement, which ribs extend from the separation plane 11. By utilizing these reinforcing ribs of the sealing elements 2 each of the disks can be guided into its respective space 12. In order to guarantee the guiding of disks 4 which guiding must be very precise, particularly when cutting an aperture 14 for receiving cables such as 5, each of the disks are provided with guiding means which form a groove and are illustrated as a pair of ribs 6, which are arranged on each side of the disks 4. As illustrated, each of the ribs 6 converges or tapers toward each other as they approach the separation plane 11a of the disks 4. Thus, the closest spacing between adjacent ribs 6 is at the separation plane.

Figure 3:
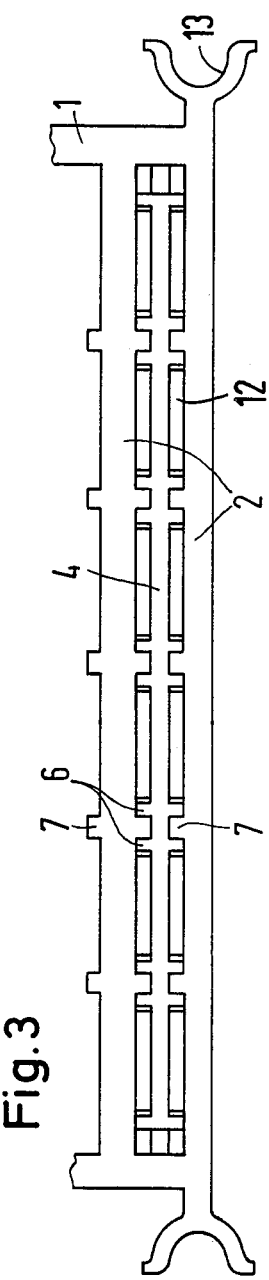
FIG. 3 is a partial view taken along with direction of the separation plane of the element.

When in the assembled state, the stiffening rib 7 of the sealing element 12 lie between two such guiding ribs 6 as can be seen in FIG. 3, which is a top view taken along the separation plane of the member 1. The disk 4 is arranged in the space 12 between the element 2 with the mutual meshing of the stiffening ribs 7 of the elements 2 and the guide ribs 6. As illustrated in FIG. 2, additional ribs 8, which run parallel to the separation plane such as 11a of the disk 4 and extending between adjacent guiding means formed by the pair of ribs 6 are present to prevent a deep penetration of sealing compound 3 into the remaining hollow spaces. This additional strengthenings of the resistance of flow of the plastic sealing compound 3 is desirable according to the invention in connection with the mechanically loaded cables. In this manner, there are now only small chambers into which the sealing compound 3 can flow so that a complete migration of the sealing compound is prevented.

Although various modifications may be suggested by those versed in the art, it should be understood that I wish to embody within the scope of the patent warranted hereon all such modifications as reasonably and properly come within the scope of my contribution to the art.

I claim:

1. In a sealing device comprising a pair of sealing members each having at least two axially spaced lamella-form sealing elements extending to a separation plane and having a ring-shaped hollow space between adjacent sealing elements, said sealing elements being adapted to be cut adjacent the separation plane to form an aperture for receiving a cable to support the cable in a cable fitting, and means for holding said sealing members with the separating planes in engagement with each other and the sealing elements forming a tight seal with the cable, the improvement comprising semicircular disks of a cuttable material being received in each of said ring-shaped hollow spaces between each pair of adjacent sealing elements of each member, each of said disks having a thickness less than the axial width of the ring-shape hollow space, each of said disks having means disposed on each side for guiding the disk as it is inserted into said ring-shape space, and each disks having transverse ribs extending between said means for guiding.

2. In a sealing device according to claim 1, wherein each of said sealing elements has reinforcing ribs extending perpendicular to the axis and inward from the separation plane of the member, and said means for guiding being formed by means for for forming a groove for each of said reinforcing ribs of the sealing elements.

3. In a sealing device according to claim 2, wherein each of the means for forming a groove comprises a pair of guide ribs.

4. In a sealing device according to claim 3, wherein said pair of guide ribs converge toward each other so that the closest spacing therebetween is adjacent to the separation plane of the member.

5. In a sealing device according to claim 2, wherein said means for forming a groove forms a groove having side walls which converge towards each other adjacent the separation plane.

* * * * *